US012678998B2

(12) United States Patent
Hockemeyer et al.

(10) Patent No.: US 12,678,998 B2
(45) Date of Patent: Jul. 14, 2026

(54) METHOD OF FORMING COMPOSITE COMPONENTS WITH CAVITIES

(71) Applicant: General Electric Company, Schenectady, NY (US)

(72) Inventors: Matthew Hockemeyer, Ballston Spa, NY (US); Scott Michael Oppenheimer, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 233 days.

(21) Appl. No.: 18/483,581

(22) Filed: Oct. 10, 2023

(65) Prior Publication Data

US 2025/0114970 A1 Apr. 10, 2025

(51) Int. Cl.

| | |
|---|---|
| ***B28B 7/36*** | (2006.01) |
| ***B28B 1/093*** | (2006.01) |
| ***B28B 1/30*** | (2006.01) |
| ***F01D 5/02*** | (2006.01) |

(52) U.S. Cl.

CPC ................ *B28B 1/093* (2013.01); *F01D 5/02* (2013.01)

(58) Field of Classification Search

CPC .. B28B 7/364; B28B 7/346; C04B 2235/6028

See application file for complete search history.

(56) References Cited

U.S. PATENT DOCUMENTS

| | | | |
|---|---|---|---|
| 1,876,156 A | 9/1932 | Thompson et al. | |
| 3,673,293 A * | 6/1972 | Teague .................... | B28B 7/346 264/225 |
| 3,907,949 A | 9/1975 | Carlson | |
| 4,040,849 A | 8/1977 | Greskovich et al. | |
| 4,615,855 A | 10/1986 | Orlowski et al. | |

(Continued)

FOREIGN PATENT DOCUMENTS

| | | |
|---|---|---|
| CN | 102527601 A | 7/2012 |
| EP | 0240190 A2 | 10/1987 |

(Continued)

OTHER PUBLICATIONS

Breede et al., Mechanical Properties and Microstructures of C/C—SiC Composite Plates by Wet Filament Winding Technique, Proc. 7th Int. Conf. on High Temp, Ceram. Matrix Comp, HT-CMC7, 2010, 10 Pages. https://www.researchgate.net/profile/M-Friess/publication/225021097_Mechanical_properties_and_microstructures_ofCC-SiC_composite_plates_by_wet_filamentwinding_technique/links/00463529e52047164000000/Mechanical-properties-and-microstructures-of-C-C-SiC-composite-plates-by-wet-filament-winding-technique.pdf.

*Primary Examiner* — Erin Snelting

(74) *Attorney, Agent, or Firm* — Dority & Manning, P.A.

(57) ABSTRACT

A method of forming a composite component includes laying up a plurality of composite plies around a mandrel assembly to form a composite ply core. The mandrel assembly includes a mandrel having an inner structural body and an outer release layer. The mandrel is configured to form a cavity in the composite ply core. The method also includes processing the composite ply core containing the mandrel assembly to compact the plurality of composite plies together. Further, the method includes removing the mandrel assembly from the composite ply core to form the cavity. Further, removing the mandrel assembly from the composite ply core includes melting out the inner structural body and removing the outer release layer after melting out the inner structural body.

13 Claims, 9 Drawing Sheets

(56) References Cited

U.S. PATENT DOCUMENTS

| | | | | |
|---|---|---|---|---|
| 4,702,877 | A * | 10/1987 | Davis, Jr. | B28B 13/06 264/516 |
| 5,015,540 | A | 5/1991 | Borom et al. | |
| 5,066,454 | A | 11/1991 | Hanson | |
| 5,177,039 | A | 1/1993 | Allaire et al. | |
| 5,330,854 | A | 7/1994 | Singh et al. | |
| 5,336,350 | A | 8/1994 | Singh | |
| 5,445,514 | A * | 8/1995 | Heitz | C23C 4/18 425/452 |
| 5,628,938 | A | 5/1997 | Sangeeta et al. | |
| 5,725,044 | A | 3/1998 | Hirokawa | |
| 5,910,095 | A | 6/1999 | Strasser et al. | |
| 6,001,436 | A | 12/1999 | Strasser et al. | |
| 6,024,898 | A | 2/2000 | Steibel et al. | |
| 6,258,737 | B1 | 7/2001 | Steibel et al. | |
| 6,280,550 | B1 | 8/2001 | Steibel et al. | |
| 6,328,834 | B1 | 12/2001 | Rebstock et al. | |
| 6,403,158 | B1 | 6/2002 | Corman | |
| 6,503,441 | B2 | 1/2003 | Corman et al. | |
| 6,627,019 | B2 | 9/2003 | Jarmon et al. | |
| 7,600,979 | B2 | 10/2009 | Steibel et al. | |
| 7,837,914 | B2 | 11/2010 | Kostar et al. | |
| 7,926,182 | B2 | 4/2011 | Hon | |
| 8,663,778 | B2 | 3/2014 | Kostar et al. | |
| 8,980,435 | B2 | 3/2015 | de Diego | |
| 9,050,769 | B2 | 6/2015 | Monaghan et al. | |
| 9,587,492 | B2 | 3/2017 | Roberts, III et al. | |
| 9,663,404 | B2 | 5/2017 | de Diego et al. | |
| 9,850,173 | B2 | 12/2017 | Keith | |
| 10,011,043 | B2 | 7/2018 | Gray et al. | |
| 10,017,425 | B2 | 7/2018 | Tuertscher et al. | |
| 10,450,235 | B2 | 10/2019 | Gray et al. | |
| 10,947,854 | B2 | 3/2021 | Quach et al. | |
| 11,040,915 | B2 | 6/2021 | Weaver et al. | |
| 11,434,781 | B2 | 9/2022 | Jain et al. | |
| 2002/0180120 | A1 | 12/2002 | Corman et al. | |
| 2003/0059577 | A1 | 3/2003 | Morrison et al. | |
| 2003/0129375 | A1 | 7/2003 | Bauer et al. | |
| 2004/0067316 | A1 | 4/2004 | Gray et al. | |
| 2005/0056020 | A1 | 3/2005 | Hadder | |
| 2005/0118392 | A1 | 6/2005 | Millard et al. | |
| 2006/0283014 | A1 | 12/2006 | Subramanian et al. | |
| 2007/0096371 | A1 | 5/2007 | McGuigan et al. | |
| 2008/0124512 | A1 | 5/2008 | Steibel et al. | |
| 2008/0132398 | A1 | 6/2008 | Kostar et al. | |
| 2008/0199661 | A1 | 8/2008 | Keller et al. | |
| 2009/0324878 | A1 | 12/2009 | Steibel et al. | |
| 2010/0255235 | A1 | 10/2010 | Ilzhoefer et al. | |
| 2010/0279845 | A1 | 11/2010 | Kebbede et al. | |
| 2011/0027525 | A1 | 2/2011 | Kostar et al. | |
| 2013/0011271 | A1 | 1/2013 | Shi et al. | |
| 2013/0017094 | A1 | 1/2013 | Schoenecker et al. | |
| 2013/0017409 | A1 | 1/2013 | Coupe et al. | |
| 2013/0171426 | A1 | 7/2013 | de Diego et al. | |
| 2014/0072736 | A1 | 3/2014 | Gray et al. | |
| 2016/0101561 | A1 | 4/2016 | Walston et al. | |
| 2016/0115086 | A1 | 4/2016 | Tuertscher et al. | |
| 2016/0229755 | A1 | 8/2016 | Luthra et al. | |
| 2016/0333698 | A1 | 11/2016 | Weaver et al. | |
| 2017/0009600 | A1 | 1/2017 | Grasso et al. | |
| 2017/0298745 | A1 | 10/2017 | Freeman et al. | |
| 2020/0079697 | A1 | 3/2020 | Weaver et al. | |
| 2024/0335977 | A1* | 10/2024 | Del Boccio | C04B 35/481 |

FOREIGN PATENT DOCUMENTS

| | | | | |
|---|---|---|---|---|
| EP | 2014447 | A2 * | 1/2009 | B28B 7/364 |
| JP | S62256605 | A | 11/1987 | |
| JP | H01198343 | A | 8/1989 | |
| JP | H07195147 | A | 8/1995 | |

* cited by examiner

METHOD OF FORMING COMPOSITE COMPONENTS WITH CAVITIES

STATEMENT REGARDING FEDERALLY SPONSORED RESEARCH AND DEVELOPMENT

This invention was made with government support under Contract No. NNC15BA05B/80GRC020F0081 awarded by the National Aeronautics and Space Administration (NASA). The government has certain rights in the invention.

FIELD

The present disclosure relates generally to composite components of turbomachines and more particularly to methods of forming composite components having cavities, such as cooling cavities, in rotor blades and stator vanes of turbomachines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. However, increased combustion temperatures can negatively impact the gas turbine engine components, for example, by increasing the likelihood of material failures. Thus, while increased combustion temperatures can be beneficial to turbine performance, some components of the gas turbine engine may require cooling features or reduced exposure to the combustion gases to decrease the negative impacts of the increased temperatures on the components.

Typically, the turbine section includes one or more stator vanes and rotor blade stages, and each stator vane and rotor blade stage includes a plurality of airfoils, e.g., nozzle airfoils in the stator vane portion and blade airfoils in the rotor blade portion. Because the airfoils are downstream of the combustion section and positioned within the flow of combustion gases, the airfoils generally include one or more cooling features for minimizing the effects of the relatively hot combustion gases, such as, e.g., film holes, cooling holes, or slots, that may provide cooling within or over the surface of the airfoils. For example, cooling apertures may be provided throughout a component that allow a flow of cooling fluid from within the component to be directed over the outer surface of the component. Further, the airfoils generally include cavities or conduits for supplying compressed, cool air to the cooling features, such as from the compressor section.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
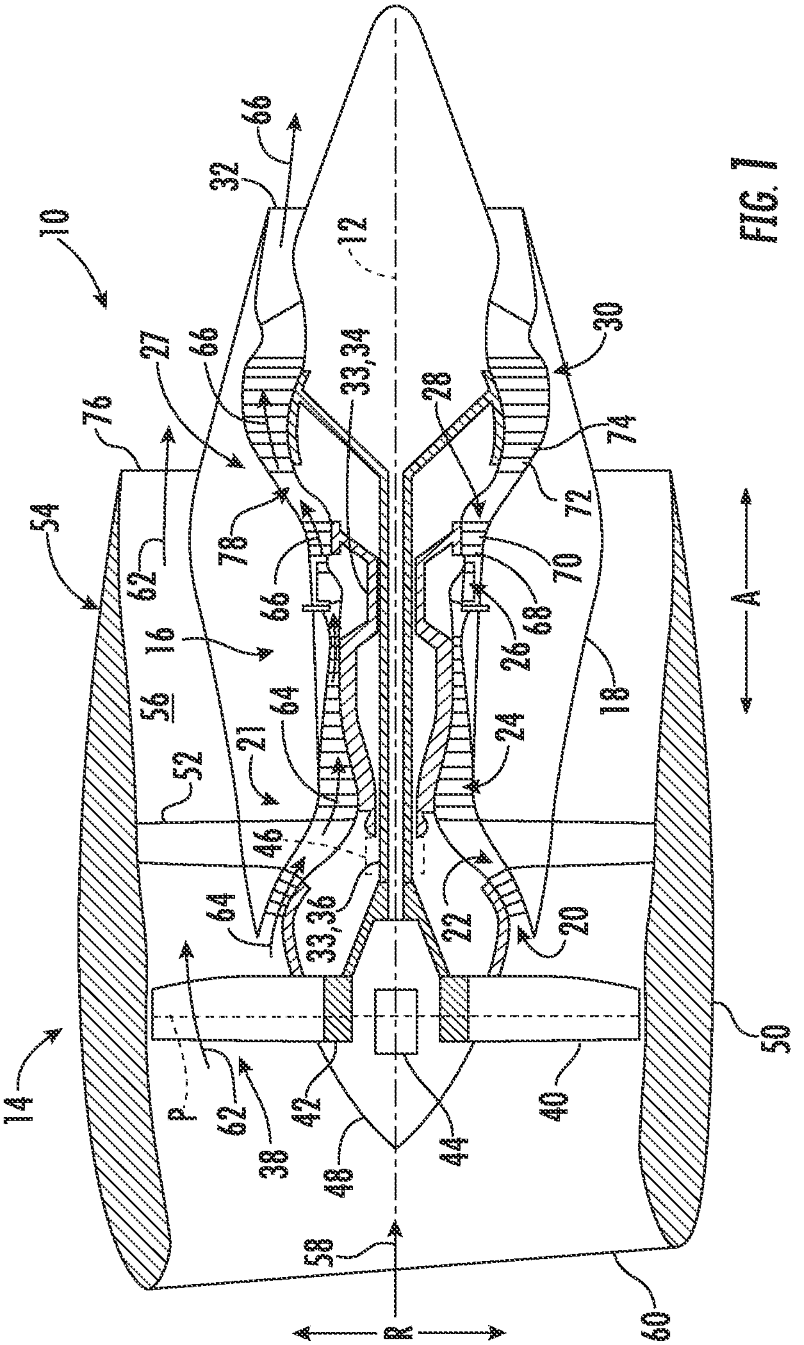
FIG. 1 illustrates a schematic cross-sectional view of a gas turbine engine in accordance with an embodiment of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", and so on may be used interchangeably to distinguish one component from another and are not intended to signify location or importance of the individual components.

The term "adjacent" as used herein with reference to two walls or surfaces refers to the two walls or surfaces contacting one another, or the two walls or surfaces being separated only by one or more nonstructural layers and the two walls or surfaces and the one or more nonstructural layers being in a serial contact relationship (i.e., a first wall/surface contacting the one or more nonstructural layers, and the one or more nonstructural layers contacting a second wall/surface).

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

As used herein, the term "composite material" refers to a material produced from two or more constituent materials, wherein at least one of the constituent materials is a non-metallic material. Example composite materials include polymer matrix composites (PMC), ceramic matrix composites (CMC), chopped fiver composite materials, etc.

As used herein, ceramic matrix composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

As used herein, polymer matrix composite or "PMC" refers to a composite material composed of a variety of short or continuous reinforcing fibers bound together by a matrix of organic polymers. PMCs are designed to transfer loads between fibers of a matrix. Some of the advantages with PMCs include their light weight, high resistance to abrasion and corrosion, and high stiffness and strength along the direction of their reinforcements.

In certain embodiments, the reinforcing fibers of CMCs and PMCs may be bundled or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC or PMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material) or polymers, are particularly suitable for higher temperature applications. Additionally, these materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components, that would benefit from the lighter-weight and higher temperature capability these materials can offer.

In general, turbine performance and efficiency may be improved by increased combustion gas temperatures. Non-traditional high temperature materials, such as ceramic matrix composite (CMC) or polymer matrix composite (PMC) materials, are more commonly used for various components within gas turbine engines. For example, because such materials can withstand relatively extreme temperatures, there is particular interest in replacing components within the flowpath of the combustion gases with these materials. However, even though these components may withstand more extreme temperatures than typical components, such components still may require cooling features or reduced exposure to the combustion gases to decrease a likelihood of negative impacts of increased combustion gas temperatures, e.g., material failures or the like.

Though many benefits may be realized by utilizing high temperature components, these materials may have drawbacks. For example, certain high temperature components may have a lower thermal conductivity than similar components formed of e.g., nickel alloys. The decreased thermal conductivity of high temperature components may necessitate the cooling features or the cavities or conduits for supplying the compressed, cool air to be closer to the airfoil surface. In addition, cooling features, cavities, or conduits with complex, intricate geometry may be particularly difficult to form in high temperature components. As such, high temperature components with cooling geometry as well as associated methods of producing such components would be useful.

Accordingly, the present disclosure is directed to systems and methods that utilize a fugitive/fusible, two-material mandrel assembly to form one or more cavities in a composite component, such as a CMC or PMC engine component. In an embodiment, the composite component may be a rotor blade or a stator vane. In particular, the mandrel assembly includes at least one mandrel having an inner structural body and an outer release layer. More particularly, in an embodiment, the inner structural body is generally formed of a metal alloy, such as a tin-zinc alloy, that defines and maintains dimensions of the cavity through compaction and consolidation of a green state core (also known as a preform) of the composite component. Thus, after the green state core is laid up, the inner structural body can be melted out of the green state core, e.g., before final processing of the green state core. Further, in an embodiment, the outer release layer is generally formed of a silicone sheath to prevent contamination of the green state core by residual material left after melting of the inner structural body. In an embodiment, the outer release layer can be completely removed after removal of the inner structural body, e.g., to ensure the molten metal does not contaminate the green state core during removal. In certain embodiments, for example, the inner release layer can be mechanically extracted after melt-out of the inner structural body.

In another embodiment, in addition to the composite component described above, the mandrel assembly according to the present disclosure can be used in fabrication of the larger composites (e.g., PMCs, CMCs, etc.). In further embodiments, the mandrel assembly according to the present disclosure can be used as a layup medium for green plies, which are subsequently processed to a secondary green state (e.g., CMC) or to completion (e.g., PMC).

It should be appreciated that, although the present disclosure is generally described herein with reference to a gas turbine engine, the disclosed systems and methods may generally be used on components within any suitable type of turbine engine, including aircraft-based turbine engines, land-based turbine engines, or steam turbine engines. Further, though the present disclosure is generally described in reference to stators and rotors in a turbine section, the disclosed systems and methods may generally be used on any component subjected to increased temperatures where cooling may be desirable.

Referring now to the drawings, wherein identical numerals indicate the same elements throughout the figures, FIG. 1 is a schematic cross-sectional view of a gas turbine engine 10 in accordance with an embodiment of the present disclosure. More particularly, for the embodiment of FIG. 1, the gas turbine engine 10 is configured as a high-bypass turbofan jet engine. Though, in other embodiments, the gas turbine engine 10 may be configured as a low-bypass turbofan engine, a turbojet engine, a turboprop engine, a turboshaft engine, or other turbomachines known in the art. As shown in FIG. 1, the gas turbine engine 10 defines an axial direction A (extending parallel to a longitudinal centerline 12 provided for reference) and a radial direction R. In general, the gas turbine engine 10 includes a fan section 14 and a core turbine engine 16 disposed downstream from the fan section 14.

The core turbine engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 27 including a high pressure (HP) turbine 28 and a low pressure (LP) turbine 30; and a jet exhaust nozzle section 32. The gas turbine engine 10 includes at least one rotating shaft 33 drivingly coupled between the compressor section 21 and the turbine section 27. For example, a high pressure (HP) shaft or spool 34 may drivingly connect the HP turbine 28 to the HP compressor 24. Similarly, a low pressure (LP) shaft or spool 36 may drivingly connect the LP turbine 30 to the LP compressor 22.

For the depicted embodiment, fan section 14 includes a variable pitch fan 38 having a plurality of fan blades 40 coupled to a disk 42 in a spaced apart manner. As depicted, the fan blades 40 extend outward from the disk 42 generally along the radial direction R. Each fan blade 40 is rotatable relative to the disk 42 about a pitch axis P by virtue of the fan blades 40 being operatively coupled to a suitable actuation member 44 configured to vary the pitch of the fan blades 40. The fan blades 40, the disk 42, and the actuation member 44 are together rotatable about the centerline 12 by the LP shaft 36 across a power gear box 46. The power gear box 46 includes a plurality of gears for stepping down the rotational speed of the LP shaft 36 to a more efficient rotational fan speed.

Referring still to the embodiment of FIG. 1, the disk 42 is covered by a rotatable front nacelle 48 aerodynamically contoured to promote an airflow through the plurality of fan blades 40. Additionally, the fan section 14 includes an annular fan casing or outer nacelle 50 that circumferentially surrounds the fan 38 or at least a portion of the core turbine engine 16. It should be appreciated that the outer nacelle 50 may be configured to be supported relative to the core turbine engine 16 by a plurality of circumferentially spaced outlet guide vanes 52. Moreover, a downstream section 54 of the outer nacelle 50 may extend over an outer portion of the core turbine engine 16 so as to define a bypass airflow passage 56 therebetween.

During operation of the gas turbine engine 10, a volume of air 58 enters the gas turbine engine 10 through an associated inlet 60 of the outer nacelle 50 or fan section 14. As the volume of air 58 passes across fan blades 40, a first portion of the volume of air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide hot combustion gas 66.

The hot combustion gas 66 are routed through the HP turbine 28 where a portion of thermal or kinetic energy from the hot combustion gas 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The hot combustion gas 66 are then routed through the LP turbine 30 where a second portion of thermal and kinetic energy is extracted from the hot combustion gas 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 or rotation of the variable pitch fan 38.

The hot combustion gas 66 is subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. At least one of the combustion section 26, the HP turbine 28, the LP turbine 30, or the jet exhaust nozzle section 32 at least partially define a flowpath 78 for routing the hot combustion gas 66 through the core turbine engine 16. Various components may be positioned in the flowpath 78 such as the HP turbine stator vanes 68, HP turbine rotor blades 70, the LP turbine stator vanes 72, or the LP turbine rotor blades 74. Further, such components may require cooling to withstand the increased temperatures of the hot combustion gas 66.

Figure 2:
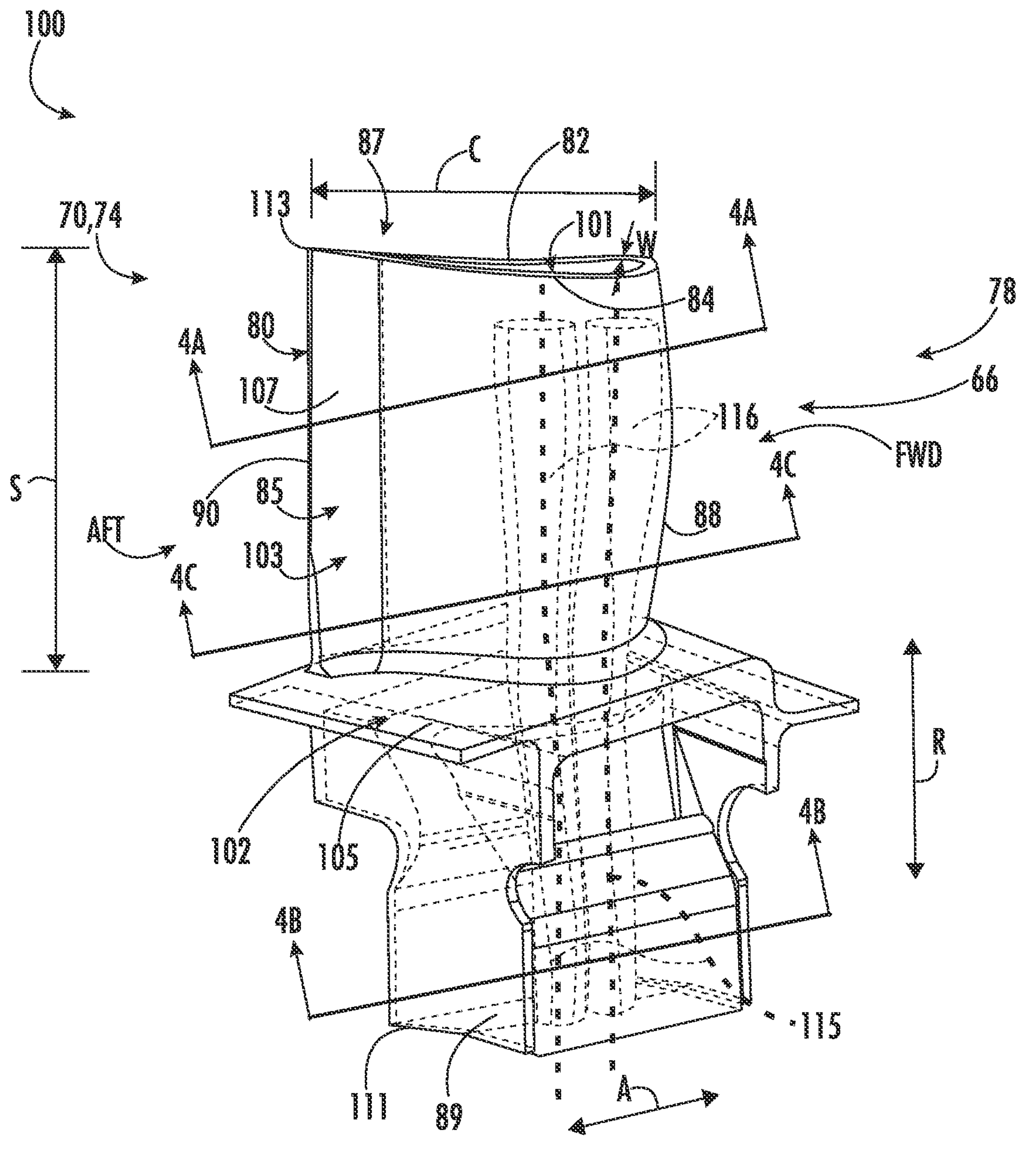
FIG. 2 illustrates a perspective view of an embodiment of a component of a gas turbine engine according to aspects of the present disclosure, particularly illustrating the component configured as a turbine rotor blade.

Referring now to FIG. 2, a perspective view of an embodiment of a component 100 of the gas turbine engine 10 (FIG. 1) is illustrated according to aspects of the present disclosure. Particularly, FIG. 2 illustrates the component 100 configured as a turbine rotor blade. In other embodiments, the component 100 may be any other component of the gas turbine engine 10 such as various shrouds, liners, bands, etc. of the gas turbine engine 10. For instance, the component 100 may be any structure that at least partially defines the flowpath 78 for the hot combustion gas 66, abuts the flowpath 78 for the hot combustion gas 66, or extends into the flowpath 78 for the hot combustion gas 66.

As shown in FIG. 2, the component 100 may include a core 101 and an outer enclosure 103. The core 101 may include an exterior surface 112 (FIGS. 4A-4C) extending along a length between a first end 111 and a second end 113. Further, the core 101 may at least partially define a cavity 116, such as a cooling cavity, extending from the first end 111 along at least a portion of the length of the core 101. For example, as shown in FIG. 2, the core 101 includes two cavities 116 that extend from the first end 111 and stop before the second end 113. In another embodiment, the cavities 116 described herein may extend the full length of the core 101 (e.g., from the first end 111 to the second end 113) or less than the full length of the core 101, depending on, for example, whether it is desirable to pressurize the cavity 116. In an embodiment, for example, to pressurize the cavity 116, the cavity 116 stops short of the second end 113, as shown in FIG. 2. In such embodiments, air within the cavity 116 can be used to supply smaller cooling channels (not shown) which connect to the outer enclosure 103.

The core 101 and cavity 116 will be described in more detail below in regard to, e.g., FIGS. 2-3 and 4A-4C. The cavity 116 may be fluidly coupled to an air supply (not shown) at the first end 111 to supply cool air 115 to the component 100. Further, as shown, the outer enclosure 103 may abut the flowpath 78 such that the hot combustion gas 66 flows past or through the component 100. The outer enclosure 103 may include an outer surface 107. The outer enclosure 103 is positioned outside the core 101 and extends from the first end 111 of the core 101 along at least a portion of the length of the core 101.

Still referring to FIG. 2, in an embodiment, the component 100 may be a turbine rotor blade. For example, the turbine rotor blade may be the LP turbine rotor blade 74 or the HP turbine rotor blade 70. In other embodiments, the component 100 may be any other turbine rotor blade of the gas turbine engine 10 (FIG. 1), such as an intermediate turbine blade. In such embodiments, the component 100 may include an inner band 102 positioned at the first end 111 with an inner band surface 105. For example, the inner band surface 105 may at least partially define the flowpath 78 such that the hot combustion gas 66 flows through the flowpath 78. As such, the inner band surface 105 may define an inner most boundary of the flowpath 78 in a radial direction R. In one particular embodiment, the inner band 102 may be configured as a platform.

In addition, as shown, a blade root 86 may be coupled to a turbine rotor disk (not shown), which in turn is coupled to the rotating shaft 33 (e.g., FIG. 1). It will be readily understood that, as is depicted in FIG. 2 and is generally well-known in the art, the blade root 86 may define a projection 89 having a dovetail or other shape for receipt in a complementarily shaped slot in the turbine rotor disk to couple the turbine rotor blade 70, 74 to the disk. Of course, each turbine rotor blade 70, 74 may be coupled to the turbine rotor disk or rotating shaft 33 in other ways as well. Generally, the hot combustion gas 66 may flow from the combustion section 26 (FIG. 1) upstream of the component 100 past or through the component 100. It should be recognized that the flowpath 78 may further be defined by the outer casing 18 as described in regard to FIG. 1 or adjacent components 100 including respective inner bands 102. The inner band 102 may be heated by the hot combustion gas 66 flowing past the inner band 102.

In any event, as shown in FIG. 2, turbine rotor blades 70, 74 may be coupled to the turbine rotor disks such that a row of circumferentially adjacent turbine rotor blades 70, 74 extend radially outward from the perimeter of each disk into, i.e., the flowpath 78 (FIG. 1). Further, as shown in FIG. 1, the hot combustion gas 66 flowing through the flowpath 78 may create a pressure differential over the turbine rotor blades 70, 74 causing the turbine rotor blades 70, 74 and thus the rotating shaft 33 to rotate. As such, the turbine rotor blades 70, 74 may transform the kinetic or thermal energy of the hot combustion gas 66 into rotational energy to drive other components of the gas turbine engine 10 (e.g., one or more compressors 22, 24 via one or more rotating shafts 33).

Figure 3:
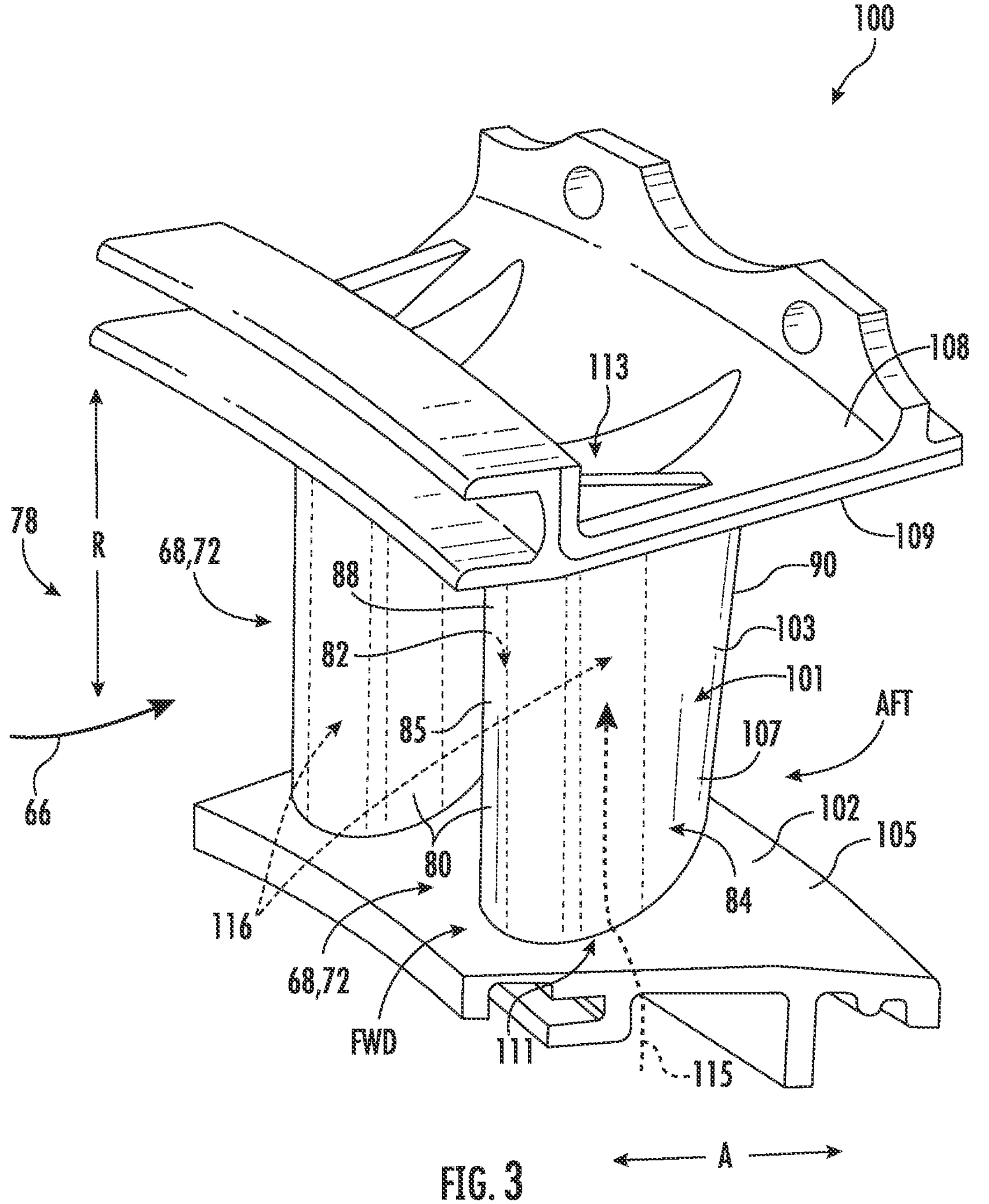
FIG. 3 illustrates a perspective view of another embodiment of a component of a gas turbine engine according to aspects of the present disclosure, particularly illustrating the component configured as a stator vane.

It should be recognized that the outer enclosure 103 (FIGS. 2 and 3) may be configured as an airfoil 80. Accordingly, in such embodiments, as shown in FIGS. 2 and 3, the outer surface 107 may include an airfoil surface 85. Further, the airfoil surface 85 may include a pressure side 82 and a suction side 84. The airfoil surface 85 may also include a leading edge 88 at a forward position (e.g., FWD) of the airfoil 80 in the axial direction A. The airfoil surface 85 may further include a trailing edge 90 at an aft position (e.g., AFT) of the airfoil 80 in the axial direction A. Further, as shown, the airfoil 80 may extend from the blade root 86 to a blade tip 87 along a span S. For example, the blade root 86 may be approximately at the first end 111 of the core 101, and the blade tip 87 may be approximately at the second end 113. As such, the airfoil 80 may extend out into the flowpath 78 of the hot combustion gas 66. Further, the hot combustion gas 66 may flow over a combination of the pressure side 82, the suction side 84, the leading edge 88, or the trailing edge 90 and thereby heat the airfoil 80. The airfoil 80 may define the chord C extending axially between the opposite leading and trailing edges 88, 90. Moreover, airfoil 80 may define a width W between the pressure side 82 and the suction side 84. The width W of airfoil 80 may vary along the span S.

Further, as shown in FIG. 2, the cavity(ies) 116 may be at least partially defined by the core 101. As such, cool air 115 may be directed toward and cool the component 100. In particular, it should be recognized that the cavity 116 may be fluidly coupled to the air supply and receive pressurized, cool air 115 from the compressor section 21 (see, e.g., FIG. 1). In such embodiments, the air supply may be the cool air supply 115. In other embodiments, the cool air 115 may be pressurized, cool air 115 from another component of the gas turbine engine 10, such as a pump or the bypass airflow passage 56. The cool air 115 received within the cavity 116 is generally cooler than the hot combustion gas 66 flowing against or over the outer surface 107 of the outer enclosure 103.

Referring now to FIG. 3, a perspective view of an embodiment of a component 100 is illustrated in accordance with aspects of the present disclosure. Particularly, FIG. 3 illustrates the component 100 configured as a stator vane. For example, the component 100 may be the HP turbine stator vane 68 of the HP turbine 28 or the LP turbine stator vane 72 of the LP turbine 30. In such embodiments, the component 100 may include an outer band 108 positioned at the second end 113 of the turbine stator vane, e.g., radially outward from the inner band 102. Further, the outer band 108 may include an outer band surface 109. For example, the outer band surface 109 may at least partially define the flowpath 78 for the hot combustion gas 66. As such, the outer band surface 109 may define an outer most boundary of the flowpath 78.

Each turbine stator vane 68, 72 may include the outer enclosure 103 configured as the airfoil 80, or, more particularly, configured as a vane, that extends from the first end 111, such as between the first end 111 and the second end 113. For example, the outer enclosure 103 or airfoil 80 may extend between the inner band 102 and the outer band 108. Each turbine stator vane 68, 72 may have the same features as the airfoil 80 described above with respect to turbine rotor blade 70, 74. For example, the stator vane 68, 72 may have a pressure side 82 opposite a suction side 84. Opposite pressure and suction sides 82, 84 of each airfoil 80 may extend radially along the span S from a vane root at the inner band 102 to a vane tip at the outer band 108. Moreover, the pressure and suction sides 82, 84 of the airfoil 80 may extend axially between a leading edge 88 and an opposite trailing edge 90.

It will be appreciated that, although the airfoil 80 of turbine stator vane 68, 72 may have the same features as the airfoil 80 of turbine rotor blade 70, 74, the airfoil 80 of turbine stator vane 68, 72 may have a different configuration than the airfoil 80 of turbine rotor blade 70, 74. As an example, airfoils 80 of the LP turbine stator vanes 72 or airfoils 80 of HP turbine rotor blades 70 may differ in size, shape, or configuration from airfoils 80 of HP turbine stator vanes 68 and LP turbine rotor blades 74. However, it also should be understood that, while airfoils 80 may differ in size, shape, or configuration, the disclosure described herein may be applied to any airfoil 80 within the gas turbine engine 10, as well as other suitable components 100 of gas turbine engine 10.

The turbine stator vanes 68, 72 may direct the hot combustion gas 66 through the flowpath 78. Further, the turbine stator vanes 68, 72 may increase the speed of the hot combustion gas 66 thereby increasing the dynamic pressure while decreasing the static pressure of the hot combustion gas 66. In such embodiments, the outer band 108 may at least partially define the flowpath 78. Further, the airfoil surface 85 or the outer band surface 109 may be heated by the hot combustion gas 66 flowing through the flowpath 78.

Figure 4A:
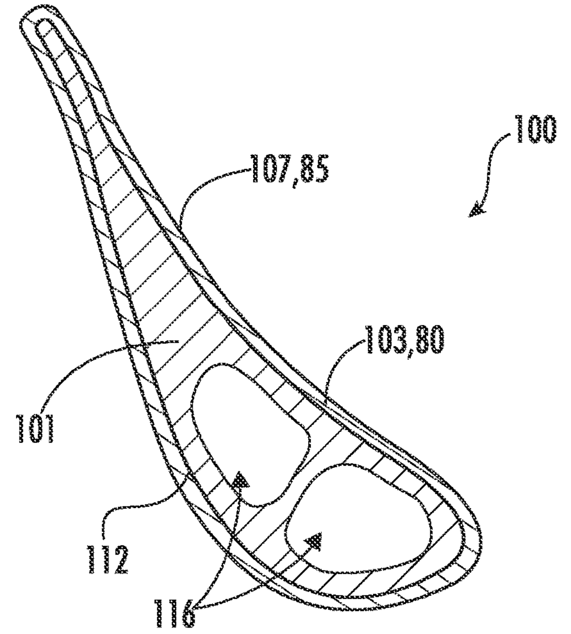
FIGS. 4A-4C illustrate various cross-sectional views of the component of FIG. 2 according to aspects of the present disclosure.
Figure 4B:
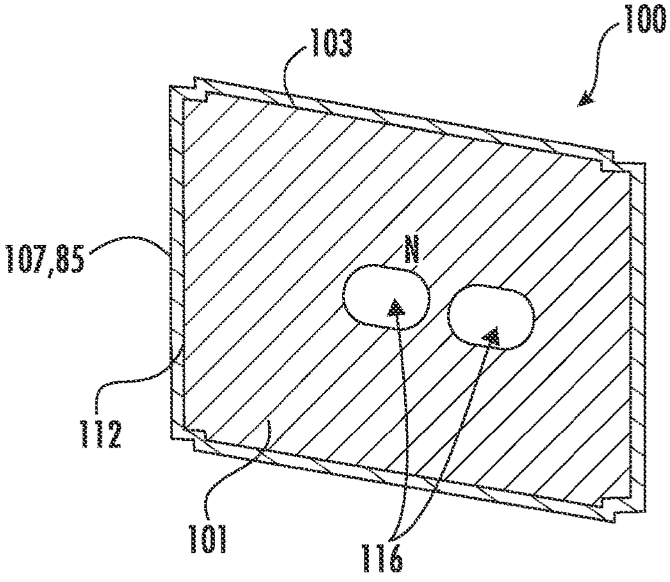
Figure 4C:
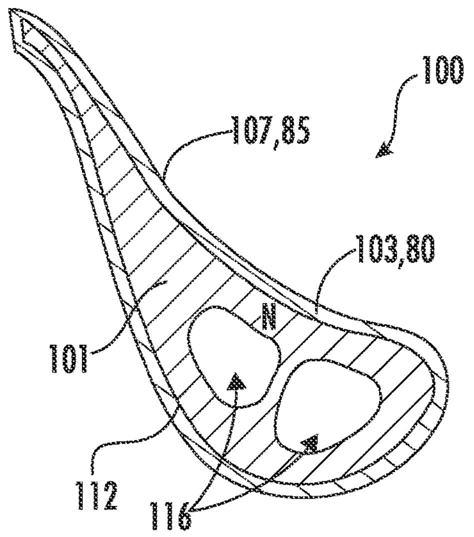

Referring now to FIGS. 4A-4C, various cross-sectional views of an embodiment of the component 100 (e.g., the turbine rotor blades 70, 74) of FIG. 2 are illustrated according to aspects of the present disclosure. It should be recognized that component 100 may be configured as a turbine rotor blade or a turbine stator vane, as well as any of the turbine stator vanes 68, 72 as described in regard to FIG. 3. As such, the outer enclosure 103 may be configured as the airfoil 80 and the outer surface 107 may be the airfoil surface 85. Though, in other embodiments, the component 100 or outer enclosure 103 may include any other structure exposed to the hot combustion gas 66.

Furthermore, as shown, the component 100 may include the core 101 and the outer enclosure 103. In an embodiment, as shown, the core 101 may generally have the same shape as the outer enclosure 103. For example, in embodiments where the outer enclosure 103 is an airfoil 80, the core 101 may also generally be shaped as an airfoil. In other embodiments, additional layers or materials may envelop the outer enclosure 103 or may be included in the outer enclosure 103. For example, the outer enclosure 103 may be formed from various layers, or various thermal coatings may be applied or sprayed on the outer enclosure 103. Still referring to FIGS. 4A-4C, in an embodiment, the outer enclosure 103 may be adhered to at least a portion of the exterior surface 112 using any suitable means, such as adhesives, tape, welding, or mechanical fasteners (e.g., bolts, screws, and rivets).

Further, the core 101 may at least partially define the cavity 116 described herein. For instance, in an embodiment, the cavity 116 may extend along the entire length of the core 101. Moreover, in an embodiment, the cavity 116 is fluidly coupled to the cool air supply 115 at the first end 111 (see, e.g., FIGS. 2 and 3). Thus, in an embodiment, the cavity 116 may provide the cool air 115 along the full length of the core 101 or the full length of the outer enclosure 103. Moreover, FIGS. 4A-4C generally illustrate cross-sectional views of the turbine rotor blade 70, 74 of FIG. 2 along various span-wise locations thereof, i.e., to indicate the cross-sections of the cavity(ies) 116 diverging along the span of the turbine rotor blade 70, 74.

In still further embodiments, as shown in FIGS. 4A-4C, the core 101 may define a plurality of cavities 116, such as two cavities 116 or greater, such as three or more, configured generally the same as each other. It should be recognized that a portion of the cavities 116 may extend along the full length of the core 101 from the cool air supply 115 at the first end 111 to the second end 113. In other embodiments, some of the cavities 116 may extend along only a portion of the core 101.

In an embodiment, at least one of the core 101 or the outer enclosure 103 may be formed from a composite material such as a CMC material or other suitable composite material having high temperature capability. Composite materials generally include a fibrous reinforcement material embedded in matrix material, such as polymer or ceramic material. The reinforcement material serves as a load-bearing constituent of the composite material, while the matrix of a composite material serves to bind the fibers together and act as the medium by which an externally applied stress is transmitted and distributed to the fibers. For instance, both the core 101 and the outer enclosure 103 may be formed from a CMC material.

In embodiments where the core 101 is formed from a CMC material, the cavity 116 may be formed into the core 101 while the core 101 is in a green state. For example, the core 101 in the green state may not be cured or may only be partially cured. It should be recognized that the core 101 in the green state may be more pliable, less brittle, and less rigid than a fully cured CMC core. The process of forming the component 100 is more fully described below in regard to FIGS. 5-8 below.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, it may be desirable to form components 100 of the gas turbine engine 10, such as components within or defining the flowpath 78, e.g., stator vanes 68, 72, turbine rotor blades 70, 74, or other components, from composite materials such as CMC materials. The components 100 may be formed from a plurality of plies of the composite material, which are laid up together or assembled with other sub-assemblies, such as ply packs, preforms, or a stack of composite plies, to define the composite component. However, the cooling cavity(ies) 116 may be difficult to form in the core 101 of such components 100 after the thermal or chemical processing. More particularly, the core 101 may be too stiff or brittle to form internal or intricate cooling cavities 116 as described herein. Additionally, a ply layup process to manufacture these components may not be accurate enough to form these types of internal or intricate passages. Further, the outer enclosure 103 or plies forming the outer enclosure 103 may adhere more easily to a core 101 that is only partially processed (e.g., in the green state).

Figure 5:
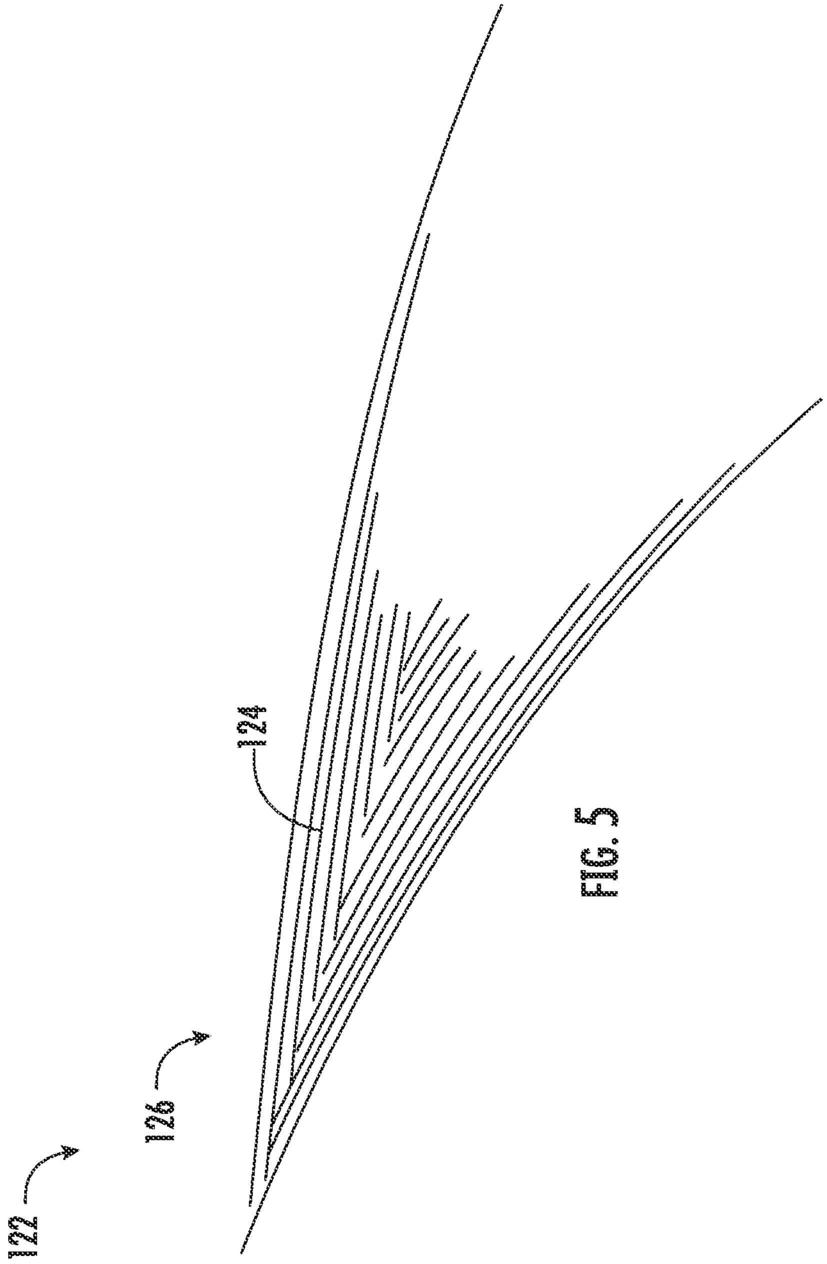
FIG. 5 illustrates a schematic diagram of an embodiment of a composite ply core according to aspects of the present disclosure, particularly illustrating the composite ply core including composite plies.

Referring now to FIG. 5, an embodiment of a composite ply core 122 is depicted according to aspects of the present disclosure. It should be recognized that the composite ply core 122 may become the core 101 described in regard to FIGS. 1-4, such as after the process of forming the component is completed. As shown, the composite ply core 122 includes a plurality of composite plies 124. As shown, the plurality of composite plies 124 may include a composite material such as a CMC material or a PMC material. The composite plies 124 may be laid up on a tool, mandrel, mold, or other suitable supporting device or surface. Preferably, each composite ply 124 of the plurality of composite plies 124 is cut, e.g., from a tape as previously described, such that each composite ply 124 is oversized. That is, each of the plurality of composite plies 124 may be longer than a final length of the ply to provide machine stock for machining the green state ply pack to predetermined dimensions as described in greater detail herein. Further, as shown in FIG. 5, the plurality of composite plies 124 form a composite ply layup 126. In some embodiments, the composite ply layup 126 may be a ply pack layup (which also may be referred to as a composite preform) or the like, which may be generally referred to as the composite ply layup 126. In certain embodiments, at least one of the composite plies 124 may be a prepreg ply. For example, at least a portion of or all of the composite plies 124 used to form the composite ply core 122 may be prepreg plies. In an embodiment, all of the composite plies 124 may be prepreg plies. In a further embodiment, at least one of the composite plies 124 may be a CMC or a PMC ply, such as all of the composite plies 124. In certain embodiments, at least one of the composite plies 124 may be a CMC or a PMC prepreg ply.

Figure 6:
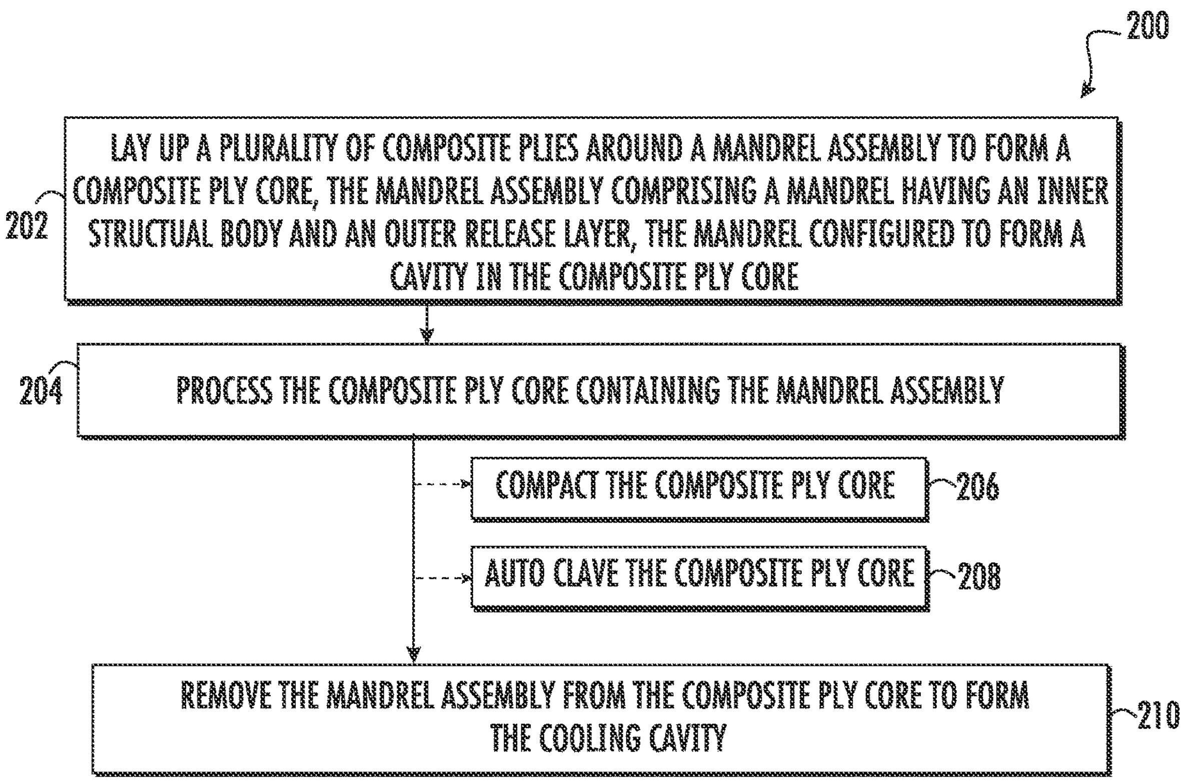
FIG. 6 illustrates a flow diagram of an embodiment of a method of forming a composite component according to aspects of the present disclosure.

Referring now to FIG. 6, a flow diagram of an embodiment of a method 200 of forming a composite component according to aspects of the present disclosure is illustrated. In certain embodiments, the component may be the component 100 for a gas turbine engine 10 as described generally in regard to FIGS. 1-5. For instance, the component 100 may be any of the turbine rotor blades 70, 74 or the turbine stator vanes 68, 72 as described above with reference to FIGS. 1-3. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, or adapted in various ways without deviating from the scope of the present disclosure.

As shown at (202), the method 200 may include laying up a plurality of composite plies around a mandrel assembly to form a composite ply core (such as composite ply core 122), with the mandrel assembly including a mandrel having an inner structural body and an outer release layer. As such, the mandrel is configured to form a cavity in the composite ply core as the composite component is being formed.

Figure 8A:
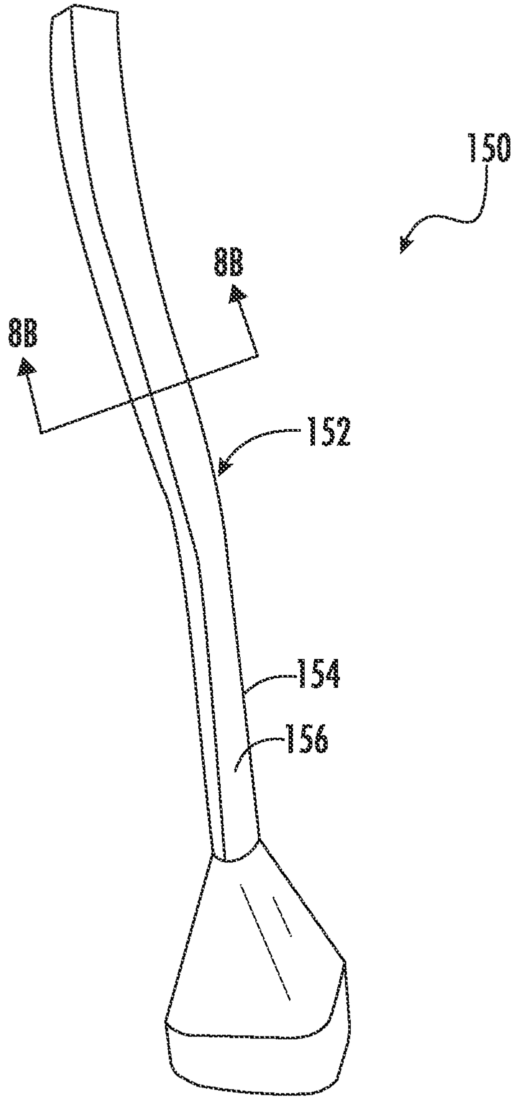
FIG. 8A illustrates a perspective view of an embodiment of a mandrel assembly for forming a cooling cavity in a component of a gas turbine engine according to aspects of the present disclosure.
Figure 8B:
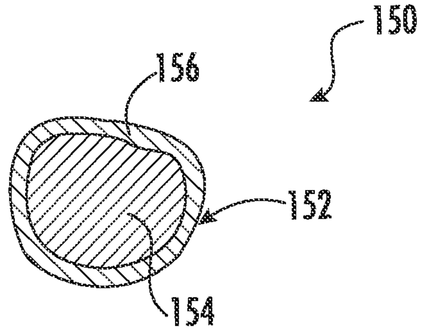
FIG. 8B illustrates a cross-sectional view of the mandrel assembly of FIG. 8A along section line 8B-8B.

In particular, as shown in FIGS. 8A and 8B, a perspective view and a cross-sectional view of an embodiment of a mandrel assembly 150 according to the present disclosure are illustrated, respectively. More specifically, as shown, the mandrel assembly 150 includes a mandrel 152 having an inner structural body 154 and an outer release layer 156. As such, the mandrel 152 is configured to form one or more of the cooling cavities in the composite ply core 122 as the composite component is being formed. For example, the cooling cavities may generally be configured as the cooling cavities 116 of FIGS. 2-4. Furthermore, in an embodiment, the cavity 116 may be formed into the composite ply core 122 from the first end 111 as illustrated in FIG. 2-3 such that the cavity 116 may be fluidly coupled to the cool air supply 115 after final processing. It should be recognized that the cooling cavities 116 described herein may be machined into any shape. For example, the cavity 116 may define a circular cross-section, an arced cross-section, an elongated cross-section, or any other suitable shape including one or more curved or straight segments.

Referring back to FIG. 6, as shown at (204), the method 200 may include processing the composite ply core containing the mandrel assembly. For example, in an embodiment, the method 200 may include partially processing the composite ply core containing the mandrel assembly to form a green state core. As such, the composite ply layup 126 may be partially processed to form a green state layup of a green state core 130 (see, e.g., FIGS. 10C and 10D). In an embodiment of the method 200, partially processing the composite ply core may include (206) compacting the composite ply core. In another embodiment of the method 200, partially processing the composite ply core 122 may include (208) autoclaving the composite ply core. In a still further embodiment of the method 200, partially processing the composite ply core may include both compacting and autoclaving the composite ply core. For instance, the composite ply core 122 (FIG. 5) may be compacted and then processed in an autoclave.

The compaction may be performed at atmosphere, i.e., at room temperature and pressure or at an elevated temperature, and may use vacuum pressure, shrink wrap, or other means to apply the compaction force/pressure. The autoclave processing may be performed at a reduced temperature, a reduced pressure, or for a shorter amount of time compared to a standard autoclave cycle. In some embodiments, partially processing the composite ply layup 126 (FIG. 5) may involve compaction only, i.e., the composite ply layup 126 may be compacted without also undergoing a reduced autoclave cycle. In other embodiments, to partially process the composite ply layup 126, the layup may undergo a reduced autoclave cycle without being separately compacted.

In such embodiments, after partial processing, the composite plies 124 forming the composite ply layup 126 retain some flexibility and malleability. Such flexibility and malleability may help in machining the composite ply layup 126. That is, partially processing the composite ply layup 126 achieves a level of consolidation and curing adequate to obtain a strength suitable for further handling, manipulating, and machining of the green state layup. In contrast, a standard autoclave cycle is typically performed as part of processing a final ply or layup assembly to obtain the final component dimensions and to rigidize the green state core. More particularly, the standard autoclave cycle imparts stiffness to the final ply or layup assembly through complete drying or curing of the composite constituents and produces the final dimensions of the composite component through full consolidation of the plies or sub-assemblies.

Further, in embodiments in which the composite ply layup 126 is processed in an autoclave, the composite ply layup 126 may be autoclaved using soft or hard tooling. For instance, the composite ply layup 126 may be autoclaved using metallic tooling, i.e., hard tooling, that is shaped to impart a desired shape to the composite ply layup 126. As another example, the composite ply layup 126 may be autoclaved using soft tooling such as a vacuum bag, e.g., the composite ply layup 126 may be supported on a metal tool and then the composite ply layup 126 and tool may be bagged and the air removed from the bag to apply pressure to and compact the composite plies 124 forming the composite ply layup 126 before the composite ply layup 126 is processed in a reduced autoclave cycle as previously described.

As stated, after the composite ply layup 126 is partially processed, the composite ply layup 126 is in a green state and thereby forms a green state layup, which may be a sub-assembly used to form the composite component, such as the component 100 of FIGS. 2-4. Thus, as shown at (210) of FIG. 6, the method 200 may include removing the mandrel assembly from the composite ply core to form the cavity. More specifically, in an embodiment, the method 200 may include removing the mandrel assembly from the green state core to form the cavity. In such embodiments, removing the mandrel assembly may include melting out the inner structural body 154 and then removing (e.g., via mechanical extraction) the outer release layer 156 after melting out the inner structural body 154. Accordingly, in an embodiment, the inner structural body 154 may be formed of a low melting temperature alloy such as a tin-zinc alloy. Further, in such embodiments, a separate heat treatment may be necessary at an increased temperature to melt off the low melting temperature metal alloy (e.g., when the melting temperature of the metal alloy is higher than temperatures used during the process to finish forming the partially formed component 117). Accordingly, in an embodiment, the inner structural body 154 of the mandrel assembly 150 is configured to define and maintain the dimensions of the cavity 116 through compaction or consolidation, whereas the inner release layer 156 is configured to ensure the molten metal alloy does not contaminate the composite ply core during removal of the inner structural body 154. Thus, after removal of the mandrel assembly 150, the cavity 116 described herein is formed.

Figure 7:
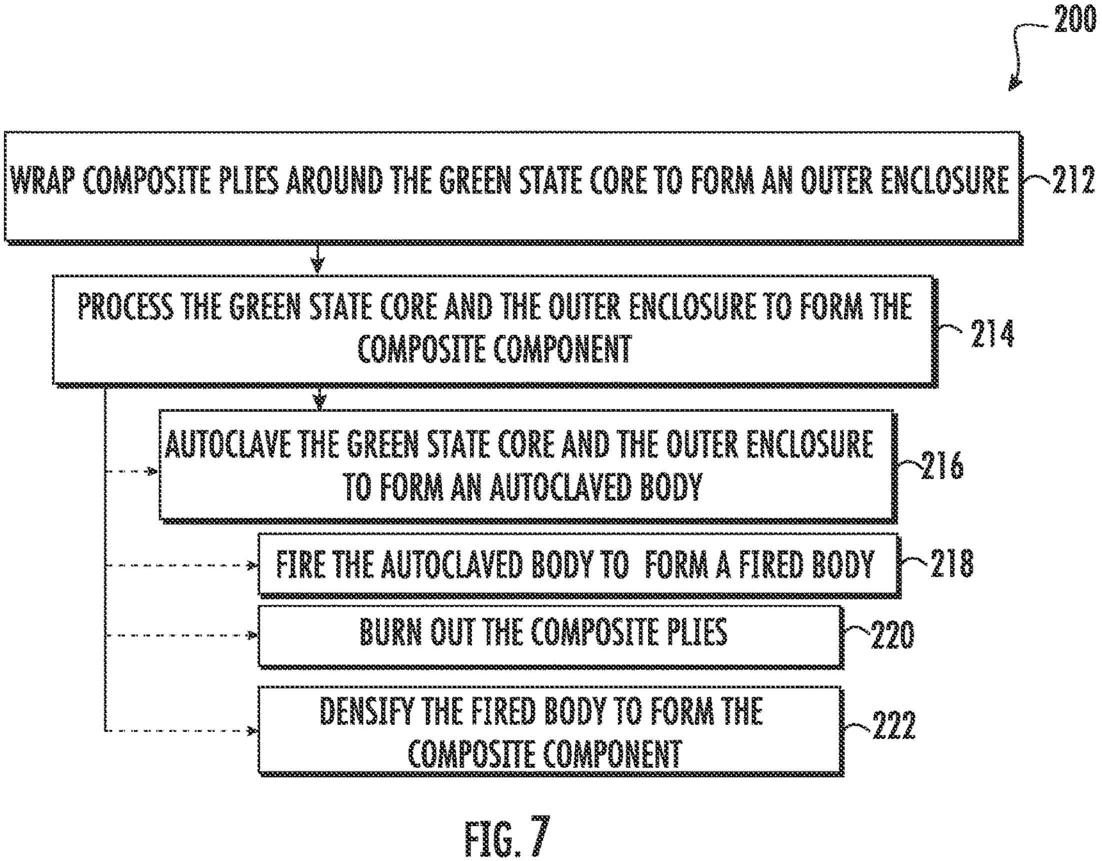
FIG. 7 illustrates a flow diagram of another embodiment of a method of forming a composite component according to aspects of the present disclosure.

Referring now to FIG. 7, a flow diagram of further optional steps of the method 200 of forming the composite component according to aspects of the present disclosure is illustrated. Particularly, in embodiments where the mandrel assembly 150 is used to form a CMC component, as shown at (212), the method 200 may include wrapping one or more additional composite plies around the green state core to form an outer enclosure. For instance, the additional composite plies may be configured as the composite plies 124 used to form the composite ply core 122. It should be recognized that the outer enclosure may generally be configured as the outer enclosure 103 as described in regard to FIGS. 2-4. Further, a portion of the composite plies 124 used to form the outer enclosure 103 may be prepreg plies. In a still further embodiment, at least one of the composite plies 124 may be a CMC prepreg ply, such as all of the composite plies 124. As such, it should be recognized that at least one of the composite plies 124 may be adhered to the green state core 130 during a final processing step of the method 200.

Figure 9:
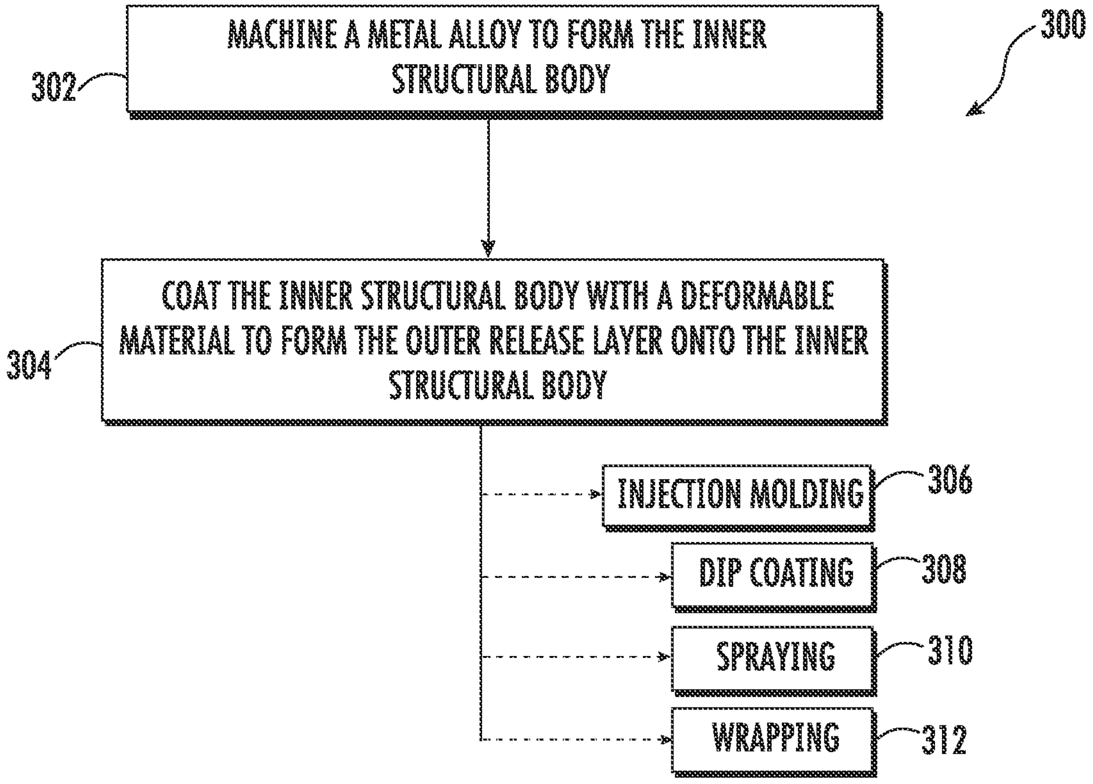
FIG. 9 illustrates a flow diagram of an embodiment of a method of forming a mandrel assembly according to aspects of the present disclosure.

Referring now to FIG. 9, a flow diagram of an embodiment of a method 300 of forming the mandrel 152 of the mandrel assembly 150 according to the present disclosure is illustrated. Thus, in such embodiments, the mandrel 152 can be formed to have a shape corresponding to a desired shape of the cavity(ies) 116. For example, as shown in FIGS. 8A and 8B, the mandrel 152 can be formed to have a unique cross-sectional shape that may vary along the span of the component 100 to be formed.

More specifically, in an embodiment, as shown in FIG. 9, forming the mandrel 152 may include (302) machining a metal alloy 158 to form the inner structural body 154 (see e.g., FIGS. 8A and 8B), e.g., such as via casting. Furthermore, as shown in FIG. 9, forming the mandrel 152 may include (304) coating the inner structural body 154 with an impervious non-metallic material 160 to form the outer release layer 156 onto the inner structural body 154 (see e.g., FIGS. 8A and 8B). In particular embodiments, for example, coating the inner structural body 154 with the impervious non-metallic material 160 to form the outer release layer 156 onto the inner structural body 154 may include (306) injection molding, (308) dip coating, (310) spraying, (312) wrapping, or any other suitable application technique. Furthermore, in such embodiments, as an example, the metal alloy 158 may be a tin-zinc alloy, whereas the impervious non-metallic material 160 may be a silicone coating, a polytetrafluoroethylene (PTFE)/Teflon coating, or a sol-gel coating.

Accordingly, in particular embodiments, the impervious non-metallic material 160 generally has thermal stability through melt-out of the inner structural body 154, as well as non-stick properties. As such, the outer release layer 156 ensures the molten metal does not contaminate the green preform during mandrel removal. After melt-out, the outer release layer 156 can be extracted from the cavity 116. As used herein, "thermal stability" is generally characterized by having a melt temperature greater than 10 degrees Celsius (° C.) relative to the melt-out temperature of the inner structural body 154. Moreover, in an embodiment, the melt-out temperature of the inner structural body 154 is limited by the composite curing temperature and a thermal degradation temperature of the impervious non-metallic material 160. For example, for the material chosen initially (e.g., silicone), the melt-out temperature may be about 260° C.

Figure 10A:
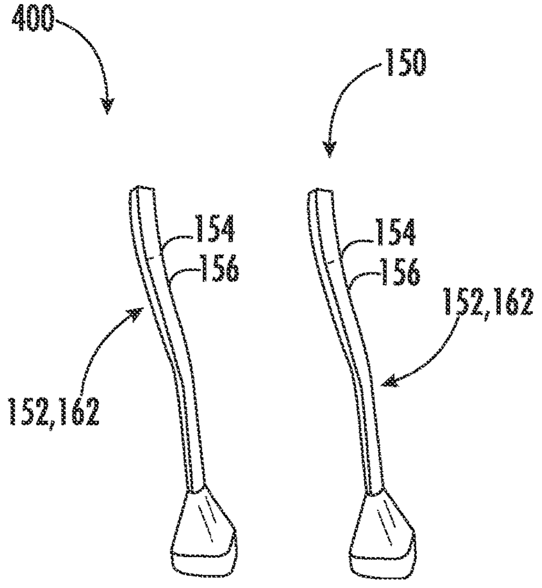
FIGS. 10A-10D illustrate various components of a system for forming a composite component according to aspects of the present disclosure.
Figure 10B:
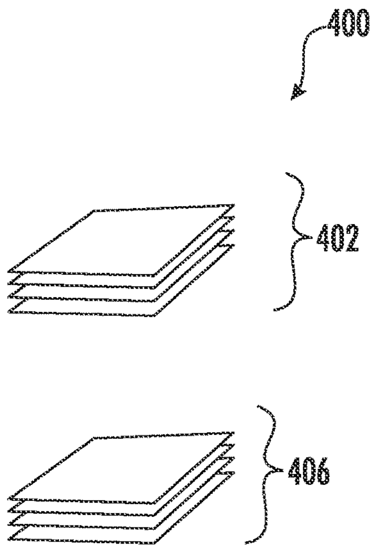
Figure 10C:
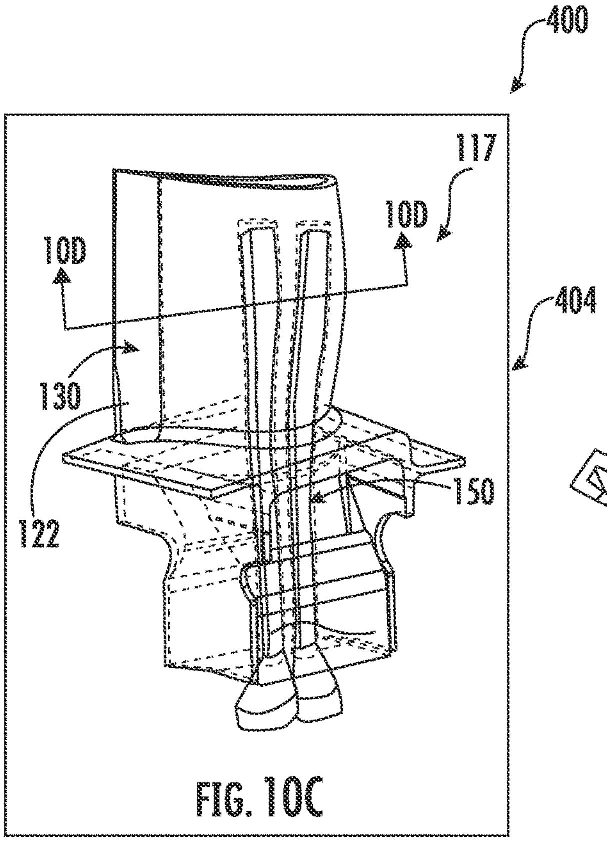
Figure 10D:
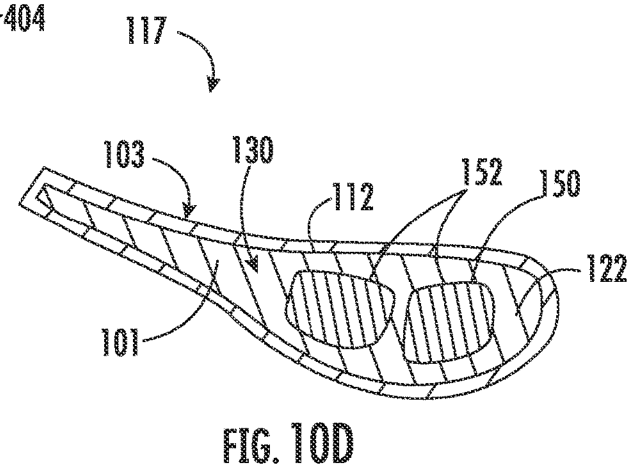

Referring particularly to FIGS. 10A-10D, various components of a system 400 for forming a composite component according to aspects of the present disclosure are illustrated. In particular, as shown in FIGS. 10C and 10D, the partially formed component 117 is illustrated according to aspects of the present disclosure. Particularly, the partially formed component 117 may be produced utilizing any or all of the steps of the method 200 prior to the final processing step. Further, it should be recognized that the partially formed component 117 may form the component 100, as illustrated in FIGS. 2-4, after the final processing step.

The partially formed component 117 may generally be configured as the completed component 100 as described in regard to FIGS. 2-4. For instance, the partially formed component 117 may include a core, such as the green state core 130, and the outer enclosure 103. The core may include an exterior surface 112 and may at least partially define the cavity 116 described therein. Further, the cavity 116 may be configured to be fluidly coupled to a cool air supply 115, such as after final processing of the partially formed component 117 to form the component 100. Further, the partially formed component 117 may be configured to become a turbine rotor blade or a turbine stator vane. As such, the outer enclosure 103 may be configured as an airfoil 80 and an outer surface 107 may be an airfoil surface 85.

However, the partially formed component 117 may include additional features not present in the finalized component 100. In particular, as shown in FIGS. 10C and 10D, the partially formed component 117 may include the mandrel assembly 150 defining and maintaining the dimensions of the cavity 116 through compaction or consolidation of the preform. Further, in an embodiment, the core may include the green state core 130 formed from a carbon matrix composite material. Though, in other embodiments, the green state core 130 may be formed from any suitable composite materials.

It should also be recognized that the partially formed component 117 may not include all of the features of the completed component 100. For example, the cavity 116 may only be fluidly coupled to the cool air supply 115 after the finalizing the component, e.g., after the mandrel assembly 150 has been removed.

The outer enclosure 103 may be positioned outside the core 101 and extend from the first end 111 of the core along at least a portion of the length of the core. It should be recognized that the outer enclosure 103 may be formed from one or more composite plies 124, which may be in an uncured or unprocessed state in the depicted partially formed component 117. Further, it should be recognized that several layers of composite plies 124 may be wrapped around the core, such as the green state core 130, to form the outer enclosure 103. For example, at least one of the composite plies 124 may contact the exterior surface 112 of the core 101. Additionally, various filler substances or intermediary layers of other materials may be included between composite plies 124.

Referring back to FIG. 6, as shown at (214), the method 200 may include processing the green state core and the outer enclosure to form the composite component. In an embodiment, processing the green state core 130 and outer enclosure 103 may include (216) autoclaving the green state core and the outer enclosure to form an autoclaved body. Further, another step may include (218) firing the autoclaved body to form a fired body. In some embodiments, processing the green state core 130 and the outer enclosure 103 may include an additional burn out step, e.g., (220) burning out the composite plies. An additional step may include (222) densifying the fired body to form the composite component. In certain embodiments, processing the green state core 130 and the outer enclosure 103 may include at least one of melt infiltration, polymer infiltration and pyrolysis, or chemical vapor infiltration (CVI).

For example, processing may include autoclaving the assembled partially formed component 117 using a standard autoclave cycle, rather than a reduced autoclave cycle as previously described, to form an autoclaved body. In embodiments in which the composite material is a CMC material, the autoclaved body then may undergo firing (or burn-off) to form a fired body, followed by densification to produce a densified CMC component that is a single piece component, i.e., the component is a continuous piece of CMC material.

For instance, after autoclaving, the component may be placed in a furnace to burn off any mandrel-forming materials or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

Referring now to FIGS. 10A-10D, schematic diagrams of an embodiment of components of the system 400 for forming a composite component according to the present disclosure are illustrated. More specifically, as shown in FIGS. 10A, 10C, and 10D, the system 400 includes the mandrel assembly 150 described herein. Furthermore, as shown particularly in FIG. 10A, the mandrel assembly 150 may include one or more mandrels 152, such as a first mandrel 162 and a second mandrel 164, each having the inner structural body 154 and the outer release layer 156 described herein. Moreover, as shown, the first mandrel 162 has a shape corresponding to a desired shape of a first cooling cavity, whereas the second mandrel 164 has a shape corresponding to a desired shape of a second cooling cavity. Thus, the first and second mandrels 162, 164 can be arranged together in a desired configuration before layup of a first plurality of composite plies 402 so as to define and maintain the dimensions of the first and second cooling cavities through compaction or consolidation of the preform. More specifically, as mentioned, the inner structural body 154 of the first and second mandrels 162, 164 may be formed of a metal alloy, whereas the outer release layer 156 the first and second mandrels 162, 164 may be formed of an impervious non-metallic, that may also be deformable or flexible material.

Moreover, as shown in FIG. 10B, the system 400 includes the first plurality of composite plies 402, such as the composite plies 124, for placing around the mandrel assembly 150 to form the composite ply core 122 (FIG. 10C). Further, as shown in FIG. 10C, the system 400 includes a consolidation apparatus 404 for processing the composite ply core 122 containing the mandrel assembly 150. In addition, as shown in FIG. 10B, the system 400 may include a second plurality of composite plies 406, such as the composite plies 124, for wrapping around the green state core 130 to form the outer enclosure 103. Moreover, the consolidation apparatus 404 is further configured to process the green state core 130 and the outer enclosure 103 to form the composite component. In an embodiment, the consolidation apparatus 404 may include a compaction device, an autoclave device, a melt infiltration device, a polymer infiltration and pyrolysis device, or chemical vapor infiltration (CVI) device.

Optionally, after processing, the composite component may be finish machined, if and as needed, and coated with one or more coatings, such as an environmental barrier coating (EBC). For example, the composite plies 124 that are wrapped around the core 101 may be oversized such that a portion of the composite plies 124 extend beyond the desired trailing edge 90 of the airfoil 80. Accordingly, after processing, the composite plies 124 may be machined to define the trailing edge 90. In other embodiments, the composite plies 124 may be machined after the outer enclosure 103 is autoclaved but before the outer enclosure 103 is fired and densified.

The mandrel assembly and associated mandrel assembly described herein provide numerous benefits not present in the prior art. Fabrication of the inner structural body defines and maintains the dimensions of the cavity through compaction and consolidation of the preform, whereas the outer release layer ensures the molten metal from melting the inner structural body does not contaminate the preform (e.g., Sn contamination) during mandrel removal with residual material. The outer release layer can also be easily manually extracted after melt-out of the inner structural body.

Further aspects of the invention are provided by the subject matter of the following clauses:

A method of forming a composite component, the method comprising: laying up a plurality of composite plies around a mandrel assembly to form a composite ply core, the mandrel assembly comprising a mandrel having an inner structural body and an outer release layer, the mandrel configured to form a cavity in the composite ply core; processing the composite ply core containing the mandrel assembly to compact the plurality of composite plies together; and removing the mandrel assembly from the composite ply core to form the cavity, wherein removing the mandrel assembly from the composite ply core comprises melting out the inner structural body and removing the outer release layer after melting out the inner structural body.

The method of any preceding clause, further comprising forming the mandrel to have a shape corresponding to a shape of the cavity.

The method of any preceding clause, wherein forming the mandrel further comprises: manufacturing a metal alloy to form the inner structural body; and coating the inner structural body with an impervious non-metallic material to form the outer release layer onto the inner structural body.

The method of any preceding clause, wherein the metal alloy has a melting temperature above a cure temperature of the composite component and below a barrier layer temperature.

The method of any preceding clause, wherein the impervious non-metallic material is a polymeric material comprising at least one of silicone, polytetrafluoroethylene, or sol-gel.

The method of any preceding clause, wherein coating the inner structural body with the impervious non-metallic material to form the outer release layer onto the inner structural body further comprises utilizing at least one of injection molding, dip coating, spraying, or wrapping to coat the inner structural body with the impervious non-metallic material to form the outer release layer.

The method of any preceding clause, further comprising: partially processing the composite ply core containing the mandrel assembly to form a green state core prior to processing the composite ply core; wrapping one or more additional composite plies around the green state core to form an outer enclosure; and processing the green state core and the outer enclosure to form the composite component.

The method of any preceding clause, wherein partially processing the composite ply core comprises at least one of compacting the composite ply core or autoclaving the composite ply core.

The method of any preceding clause, wherein processing the green state core and the outer enclosure comprises: autoclaving the green state core and the outer enclosure to form an autoclaved body; firing the autoclaved body to form a fired body; and densifying the fired body to form the composite component.

The method of any preceding clause, wherein processing the green state core and the outer enclosure comprises: at least one of melt infiltration, polymer infiltration and pyrolysis, or chemical vapor infiltration.

The method of any preceding clause, wherein at least one of the plurality of composite plies is a ceramic matrix composite ply.

The method of any preceding clause, wherein the composite component is a gas turbine engine component.

The method of any preceding clause, wherein the composite component is at least one of a turbine rotor blade or a turbine stator vane.

A system for forming a composite component, the system comprising: a mandrel assembly comprising a first mandrel having an inner structural body and an outer release layer; a first plurality of composite plies for placing around the mandrel assembly to form a composite ply core, the first mandrel configured to form a cavity in the composite ply core; and a consolidation apparatus for processing the composite ply core containing the mandrel assembly, wherein, after processing the composite ply core, the inner structural body is melted out from the composite ply core and the outer release layer is removed after melting out the inner structural body.

The system of any preceding clause, further comprising a second plurality of composite plies for wrapping around a green state core formed by consolidating the composite ply core to form an outer enclosure, wherein the consolidation apparatus is further configured to process the green state core and the outer enclosure to form the composite component.

The system of any preceding clause, wherein the first mandrel has a shape corresponding to a desired shape of the cavity, and wherein the inner structural body of the first mandrel is formed of a metal alloy and the outer release layer is formed of an impervious non-metallic material.

The system of any preceding clause, wherein the mandrel assembly further comprises a second mandrel for forming a second cavity in the composite ply core.

The system of any preceding clause, wherein at least one of the plurality of composite plies is a ceramic matrix composite ply.

The system of any preceding clause, wherein the consolidation apparatus comprises at least one of a compaction device, an autoclave device, a melt infiltration device, a polymer infiltration and pyrolysis device, or chemical vapor infiltration (CVI) device.

This written description uses exemplary embodiments to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a composite component, the method comprising:

laying up a plurality of composite plies around a mandrel assembly to form a composite ply core, the mandrel assembly comprising a mandrel having an inner structural body and an outer release layer, the mandrel configured to form a cavity in the composite ply core;

processing the composite ply core containing the mandrel assembly to compact the plurality of composite plies together; and removing the mandrel assembly from the composite ply core to form the cavity, wherein removing the mandrel assembly from the composite ply core comprises melting out the inner structural body and removing the outer release layer after melting out the inner structural body.

2. The method of claim 1, further comprising forming the mandrel to have a shape corresponding to a shape of the cavity.

3. The method of claim 2, wherein forming the mandrel further comprises:

manufacturing a metal alloy to form the inner structural body; and coating the inner structural body with an impervious non-metallic material to form the outer release layer onto the inner structural body.

4. The method of claim 3, wherein the metal alloy has a melting temperature below a melting temperature of the outer release layer.

5. The method of claim 3, wherein the impervious non-metallic material is a polymeric material comprising at least one of silicone, polytetrafluoroethylene, or sol-gel.

6. The method of claim 3, wherein coating the inner structural body with the impervious non-metallic material to form the outer release layer onto the inner structural body further comprises utilizing at least one of injection molding, dip coating, spraying, or wrapping to coat the inner structural body with the impervious non-metallic material to form the outer release layer.

7. The method of claim 1, wherein processing the composite ply core containing the mandrel assembly to compact the plurality of composite plies together forms a green state core, and further comprising:

wrapping one or more additional composite plies around the green state core to form an outer enclosure; and processing the green state core and the outer enclosure to form the composite component.

8. The method of claim 7, further comprising autoclaving the composite ply core.

9. The method of claim 7, wherein processing the green state core and the outer enclosure comprises:

after removing the mandrel assembly, autoclaving the green state core and the outer enclosure to form an autoclaved body;

firing the autoclaved body to burn out the composite plies and form a fired body; and densifying the fired body to form the composite component.

10. The method of claim 7, wherein processing the green state core and the outer enclosure comprises:

at least one of melt infiltration, polymer infiltration and pyrolysis, or chemical vapor infiltration.

11. The method of claim 1, wherein at least one of the plurality of composite plies is a ceramic matrix composite ply.

12. The method of claim 1, wherein the composite component is a gas turbine engine component.

13. The method of claim 1, wherein the composite component is at least one of a turbine rotor blade or a turbine stator vane.

* * * * *